United States Patent [19]

Ishii et al.

[11] 4,187,020
[45] Feb. 5, 1980

[54] TRIPOD RACK AND PINION FOCUSSING MECHANISM ROTATABLE RELATIVE TO LENS

[75] Inventors: Tadayoshi Ishii, Hannou; Zenichi Okura, Omiya; Takeshi Machida, Tokyo, all of Japan

[73] Assignee: Asahi Kogaku Kogyo Kabushiki Kaisha, Tokyo, Japan

[21] Appl. No.: 951,206

[22] Filed: Oct. 13, 1978

[30] Foreign Application Priority Data

Oct. 15, 1977 [JP] Japan .................................. 52/123927

[51] Int. Cl.² .......................... G03B 3/00; G03B 17/00
[52] U.S. Cl. .................................... 354/195; 354/286; 354/293
[58] Field of Search ................. 354/195, 286, 25, 293, 354/195–201, 286, 295; 350/255

[56] References Cited

U.S. PATENT DOCUMENTS

3,589,260  6/1971  Ferra .................................... 354/293

OTHER PUBLICATIONS

Novoflex leaflet; Distr. Internat'l Photographic Exposition, Washington D. C., 3/1957.

Primary Examiner—Donald A. Griffin
Assistant Examiner—Shelley Wade
Attorney, Agent, or Firm—Sughrue, Rothwell, Mion, Zinn and Macpeak

[57] ABSTRACT

A photographic lens mount has a tripod portion that is rotatable about the optical axis of the lens. A rack and pinion type of focussing mechanism is used and the pinion is fixed with respect to the tripod mounting seat irrespective of the rotational position of the lens support and the camera body. The ring portion of the gear mechanism is formed on a ring that is rotatable with respect to the camera support around the optical axis.

4 Claims, 5 Drawing Figures

TRIPOD RACK AND PINION FOCUSSING MECHANISM ROTATABLE RELATIVE TO LENS

BACKGROUND OF THE INVENTION

This invention relates to a rack and pinion type focussing mechanism having a converting mechanism of lateral and longitudinal camera positions in a photographic lens mount. Lens mounts for lenses having long focal lengths are large in total length, outer diameter and weight. Most lens mounts, therefore, have tripod mounting portions used to secure the lens when used in photography. It is often required to take a telephoto or wide angle picture on film corresponding to an object to be photographed. Therefore, for such photography it is required to take the picture with either a lateral or longitudinal camera position to properly frame the subject. If the picture is taken while the camera is siezed directly by the operator's hands, any camera position can obviously be freely selected.

In a lens having such weight of lens mount that suitable photographing can be accomplished when a tripod is secured to the camera body side, it is also possible easily to convert between the lateral and longitudinal camera position in the tripod head therefor. However, in a lens mount for a lens having a long focal length, wherein a tripod mounting portion is not provided on the camera side but on the lens mount side, a lateral-longitudinal camera position converting mechanism must be provided on the lens mount side.

In a manual stopping-down lens mount, it is possible to convert the camera position irrespective of a focussing mechanism by providing the lateral-longitudinal camera position converting mechanism in the vicinity of the camera mounting portion since no cooperating member between the mount and the camera is required for stopping-down. On the other hand, in a lens mount having an automatic stopping-down wherein a cooprating member between the lens mount and camera sides is required, it is required to carry out the 90° lateral-longitudinal camera position conversion with maintaining the relative position of the cooperating member constant. Accordingly, there is, generally provided such systems, a tripod mounting seat on the lens mount side that is rotatable with respect to the optical axis in order to achieve the 90° camera position conversion of the overall lens mount including a camera body with respect to the tripod mounting seat. However, in this method, since the overall lens mount is rotated with respect to the tripod mounting seat to thereby achieve the 90° camera position conversion, the focussing mechanism is also rotated by 90° therewith.

The following defects of this technique are inevitable. First, in view of the mode of operation of the focussing mechanism, a rack and pinion type is far superior to a helicoid type for the focussing mechanism which is heavy and has a large operational portion diameter, wherein the amount of the lens advancing during focussing is large. However, the helicoid type is generally used in the camera position converting system in which the lens mount is rotated with respect to the tripod mounting seat. This is the reason why in the rack and pinion type focussing mechanism, though focussing operational member having a good operationability is established for a lateral camera position, when the 90° camera position conversion is carried out for the longitudinal position, the focussing operational member is rotated to a position where the ability to effectively operate the mechanism is deteriorated.

Furthermore, in order to prevent a blurred picture from being generated, the tripod mounting portion of such a lens mount must be provided as far as possible from the center of gravity of the overall lens mount including a camera body. This will provide for the most stable camera platform. In view of photographic operation when using a tripod, it is generally desired to provide the tripod mounting seat near the camera. It is essential for good operation to lighten the weight of the camera-lens portion which is moved by focussing. It is therefore preferable to provide the focussing operational member at a closer position to the camera body than the tripod mounting seat.

When the outer projected portions such as the focussing operational member of the rack and pinion type are rotated by 90°, the outer projected portions are brought into contact with the tripod head. For this reason, it is necessary to minimize the projected portions of both the tripod mounting seat and the rack and pinion type operational member to prevent the projected portions from abutting with the tripod or to widen the spaced relation to prevent the contact therebetween. The former case sacrifices ease of operation and the latter case also sacrifices stability of the system, tending to blur image photographed.

On the other hand, in a helicoid type focussing mechanism, the operational portion diameter is large and the rotational angle is large. Therefore, as mentioned the helicoid type is inferior to the rack and pinion type. However, since the overall outer circumference of the body of revolution with respect to the optical axis can be the focussing operational member itself, the operation of the mechanism is not deteriorated even after the 90° camera position conversion. Since there are no projected portions on the outer periphery thereof, a substantial degree of freedom exists for the establishment of a positioning relation to the tripod mounting seat. A conventional focussing mechanism of the lens mount having an automatic stopping-down mechanism and the lateral and longitudinal camera position converting mechanism is generally a helicoid type.

SUMMARY OF THE INVENTION

This invention provides a rack and pinion type focussing mechanism, without the conversion of the focussing operational member with respect to the tripod seat in lateral and longitudinal camera position conversion. Such a system results in the prevention of blurs in photograph by providing a focussing operational member to the tripod mounting portion.

Accordingly, it is an object of this invention to provide for a focussing mechanism of the rack and pinion type that is operable irrespective of camera position.

It is another object of this invention to define a focussing mechanism for a telephoto lens that remains in the same operative position relative to the mounting seat, irrespective of camera position.

Another object of this invention is to provide a focussing mechanism that is easy to use and allows flexibility of camera operation.

These and other objects of this invention will be apparent from the description of the preferred embodiment that follows.

DESCRIPTION OF THE PREFERRED EMBODIMENT

Figure 1:
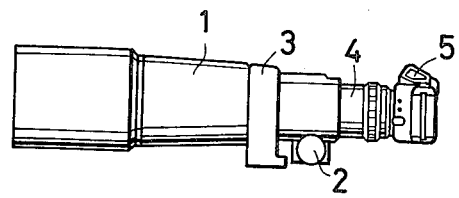
FIG. 1 is a side view of a prior art device having a rack and pinion type focussing mechanism.

The preferred embodiment of this invention will now be described in reference to the accompanying drawings. FIG. 1 shows a conventional lens mount having a rack and pinion type focussing mechanism in the lateral position photographing of the camera. Reference numeral 1 designates a lens support having a rack and pinion type focussing mechanism operational member 2 and an engaging portion rotatable around the optical axis with respect to a tripod mounting portion 3. The lens support 1 further includes an engaging portion and guide with a camera support 4 required to move along with the optical axis by engagement between a rack of the camera support 4 and a pinion of the focussing operational member 2.

The camera support 4 includes the above mentioned rack, a guide groove which is engagable with the above mentioned guide of the lens support 1, and a mounting portion of the camera 5. The guide of the lens support 1 and the guide groove of the camera support 4 serve to guide, with respect to the movement in the optical axis direction, and to define the positioning with respect to rotation around the optical axis.

Figure 2:
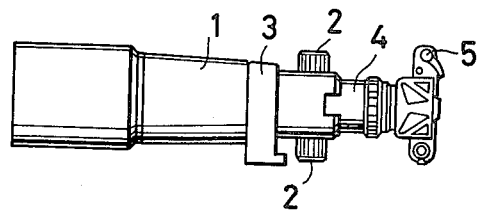
FIG. 2 is also a side view of the prior art device shown in FIG. 1, the camera position being converted to the longitudinal framing.

FIG. 2 shows a longitudinal camera position where the lens support 1 is rotated by 90° around the optical axis from the position shown in FIG. 1. Since the focussing operational member 2 is rotated with respect to the tripod mounting portion 3 as shown in FIGS. 1 and 2, the focussing operational member 2 which is positioned at good operational location in FIG. 1 is now turned to a poor position as shown in FIG. 2. As shown, the operational member 2 is now turned up and down. To overcome that deficiency in the prior art, the present invention allows the focussing mechanism to be rotatable about the optical axis relatively to the lens support.

Figure 3:
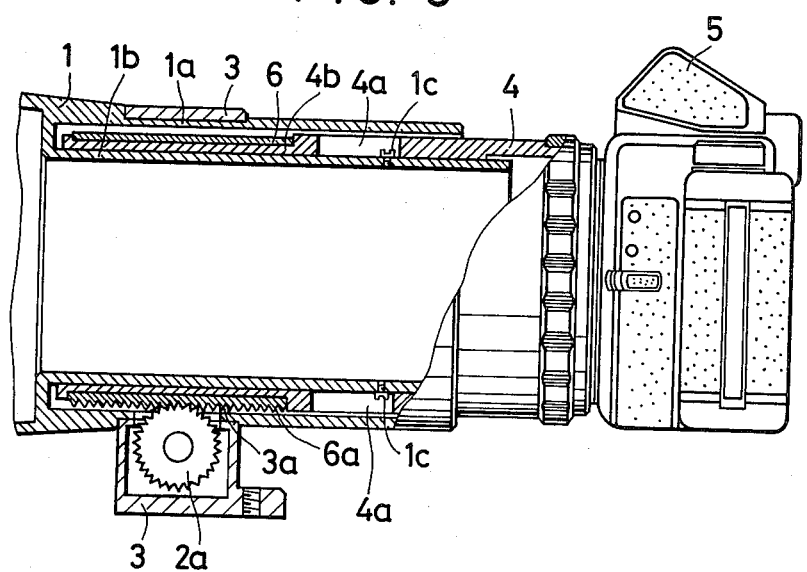
FIG. 3 is a side cross section of the focussing mechanism in accordance with this invention.
Figure 4:
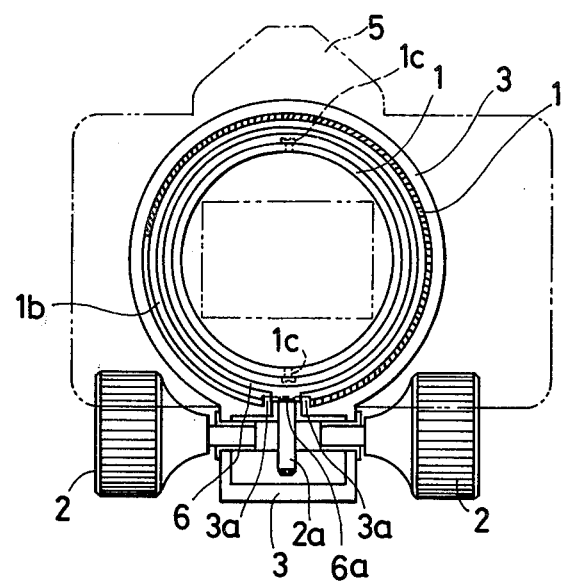
FIGS. 4 and 5 are lateral and longitudinal front views of the mechanism shown in FIG. 3.
Figure 5:
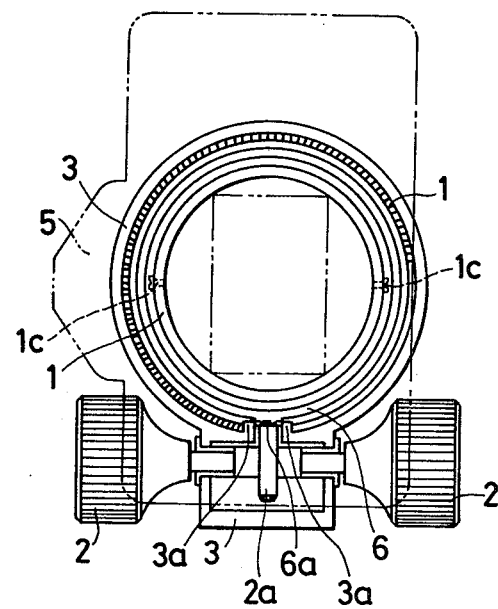

FIG. 3 shows a cross sectional view of a side of the primary part of an embodiment according to the present invention and, FIGS. 4 and 5 show frontal views of the lateral and longitudinal camera position in photographing according to the present invention. The same reference numerals are used to denote common elements in all figures. Reference numeral 1 designates a lens support having an engaging portion 1a rotatable around the optical axis with respect to a tripod mounting seat 3, a slidable portion 1b with a camera support 4 and guides 1c. Reference numeral 3 designates a tripod mounting seat supporting a focussing operational member 2 having a pinion 2a cooperating with rack ring 6 in the rotational direction around the optical axis. Guide projections 3a serve to guide the movement in the optical axis direction. The camera support 4 includes guide grooves 4a for the guides 1c positioned in the space defined by the outer portion of the lens support 1 and the slidable portion 1b. The camera support 4 further includes a rotationally engaging portion 4b cooperating with rack ring 6 and a mounting portion to the camera 5. The rack ring 6 includes a rack 6a engagable with the pinion 2a. The movement of the rack ring 6 in the optical axis direction is defined by the camera support 4 while the rotation of the ring 6 around the optical axis is independent of the camera support 4.

In FIGS. 3 and 4, when the focussing oprational member 2 is manually rotated, the camera support 4 (now shown in section) is led by the guides 1c and the guide grooves 4a and is linearly moved in the optical axis direction by the engagement between the pinion 2a and the rack 6a of the rack ring 6 to thereby carry out the focussing procedure. When the camera position is converted from the state shown in FIG. 4 to the state shown in FIG. 5, that is, from the lateral camera position to the longitudinal camera positon, the mechanism operates as follows. When the lens support 1 is rotated 90° with respect to the tripod 3, by the engagement between the guides 1c of the lens support 1 and the guide grooves 4a of the camera support 4, the camera support 4 is rotated by the same 90° angle and the camera 5 mounted on the camera support 4 is also rotated by 90°. Accordingly, the camera is rotated by 90° with respect to the tripod mounting seat 3. On the other hand, the focussing operational member 2 and the pinion 2a which are secured to the tripod mounting seat 3 are not rotated. The position conversion of the member is not carried out.

At the same time, since the rotation of the rack ring 6 around the optical axis is defined by the projections 3a, the rack ring 6 is not rotated with respect to the tripod mounting seat 3. In essence, since the position of the engagement between the rack 6a and the pinion 2a is not varied with respect to the tripod mounting seat 3 and at the same time, the relative rotation between the rack ring 6 and the camera support 4 around the optical axis is not defined, the lateral and longitudinal camera position conversion is readily achieved. Moreover, in the rack and pinion type focussing mechanism according to the present invention, the relative positioning relation between the lens support 1 and the camera support 4 including the camera 5 is not varied and such members can be rotated by 90° with respect to the tripod mounting seat 3. This results in an ideal focussing mechanism for a lens mount having a long focal length and an automatic stopping-down mechanism.

The present invention is described with respect to the specific embodiment discussed herein. However, the invention is not limited to the specific elements shown. If the rack and pinion are a plain toothed configuration such as a spur gear, it is possible to form gear teeth on the overall circumference of the rack ring 6 covering an angle of 360°. With such a rack and pinion design, even if the rack ring 6 is rotated around the optical axis, the position of the engagement between the rack and the pinion 2a is considered to be the same. In this case, the rack ring 6 and the camera support 4 are integrally formed as one mechanical part, and therefore, the guide projections 3a are not necessary in order to obtain the same effect of the above described embodiment.

Though a click stop mechanism and a lock mechanism for lateral and longitudinal camera position are not shown in the engagement portion 1a of the lens support 1 with the tripod mounting portion, this structure may, of course, be applied to this portion.

It is apparent that other modifications are possible without departing from the essential scope of this invention.

What is claimed is:

1. In a rack and pinion type focussing mechanism for a camera, a lens having a tripod mounting seat, the improvement comprising; focussing operational means disposed on said tripod mounting seat rotatable with respect to the lens around the optical axis of the lens.

2. In a camera, a phtographic lens having a mount, comprising a tripod mounting seat rotatable with respect to the lens around the optical axis of the lens, and a rack and pinion type focussing mechanism for said lens, wherein the relative positional relation between focussing operational means including a pinion and said tripod mounting seat is fixed in lateral and longitudinal camera position conversion.

3. A rack and pinion type focussing mechanism as defined in claim 2, further comprising a rack for engaging with said pinion formed on an outer periphery of a camera support, said rack having a circumferential length exceeding that corresponding to the lateral and longitudinal camera converting angle and, the engagement position between the rack and the pinion being constant with respect to the optical axis direction.

4. A rack and pinion type focussing mechanism as defined in claim 2, further comprising, a ring having a rack and rotatable with respect to a camera support around the optical axis of the lens, the movement of the ring being defined in the optical axis direction.

* * * * *